March 3, 1964  W. J. HUMPAL  3,123,383
SAFETY DEVICE
Filed Sept. 25, 1961

INVENTOR.
WILLARD J. HUMPAL
BY
ATTORNEYS

United States Patent Office 3,123,383
Patented Mar. 3, 1964

3,123,383
SAFETY DEVICE
Willard J. Humpal, 815 13th St., Boulder, Colo.
Filed Sept. 25, 1961, Ser. No. 140,539
6 Claims. (Cl. 280—457)

This invention relates to safety devices of the type to prevent two objects, one moveable with respect to the other, from becoming separated one from the other and more particularly to safety chains.

With the increased popularity of towed vehicles, i.e., trailers and the like, rules and regulations of the various states have become more rigid as to securing same to a towing vehicle. The danger of a trailer coupling failing or being improperly attached has placed great emphasis upon the use of safety chains to secure a trailer to a towing vehicle independent of the trailer coupling. The most common type of safety chain comprises a chain having an end secured to the tongue or towing portion of a trailer with some provision of securing the other end to the towing vehicle. Such a safety chain has many serious drawbacks, not the least of which is the absence of control over a trailer which has become disconnected from the trailer coupling.

It is an object of this invention, therefore, to provide an improved safety chain which avoids one or more of the disadvantages of the prior art arrangement and which provides improved control over a trailer uncoupled from its towing coupling.

It is a further object of this invention to provide a safety chain that is simple to use, that will automatically remain in locked position, provides complete safety and control in the event the trailer becomes uncoupled, is attractive in appearance and is inexpensive to manufacture.

In accordance with the invention, the safety chain comprises a key-hole link the larger opening of which is adapted to be received over the coupling ball of a trailer coupling and the smaller portion of which is sized to be received by the shank of the coupling ball but retained by the ball and at least one chain connecting the key-hole link to the tongue of a trailer.

For a better understanding of the present invention, together with other and further objects thereof, reference is had to the following description taken in connection with the accompanying drawing and its scope will be pointed out in the appended claims.

Figure 4:
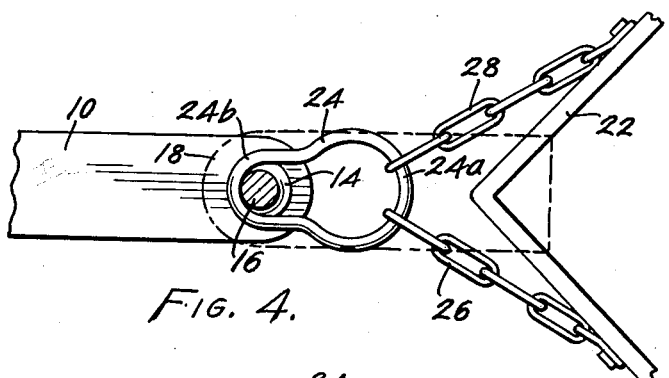
FIGURE 4 is a plan view, partly in section, showing the key-hole fully rotated with the shank of the ball within the smaller portion.

Referring to FIGURES 1–4 of the drawing, there is shown a trailer hitch member 10 which may be conveniently attached to the towing vehicle, as by welding and the like, to the rear of the frame such as a cross member or by bolting and the like to the rear bumper. A ball 12 of a trailer coupling is secured to the hitch 10 as by welding or more often ball 12 is provided with a threaded stud depending from the shoulder 14 which passes through a hole in the hitch and is secured by means of a nut and suitable lock washer. Above shoulder 14 and below the spherical portion, ball 12 is provided with a reduced portion or shank 16. The trailer portion 18 of the coupling adapted to receive ball 12 for rotative movement is provided with internal means, not shown, actuated by a lever or the like 20, to lock the trailer portions of the coupling to ball 12 completing the coupling. The trailer portion 18 is secured by suitable means to the tongue 22 which may be a single member or the apex of an A-frame, as best seen in FIGURE 4.

Figure 1:
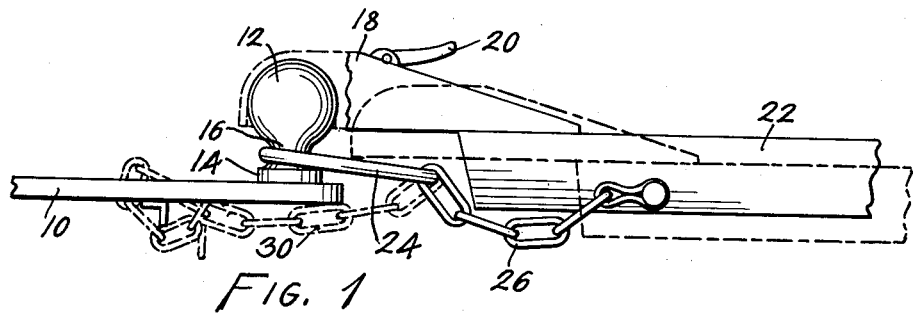
FIGURE 1 is a view in elevation of a safety chain according to the present invention installed on and showing the relation therof to a trailer coupling.
Figure 2:
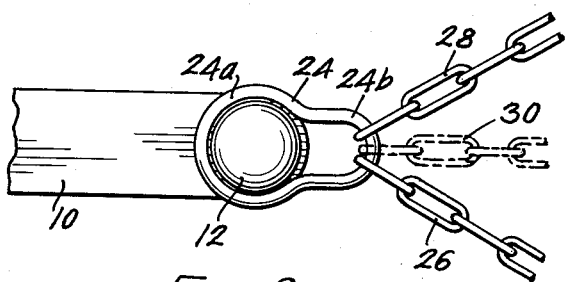
FIGURE 2 is a plan view showing the relationship between the safety chain according to the invention and the ball of a trailer coupling as the key-hole link is being placed over the ball.
Figure 3:
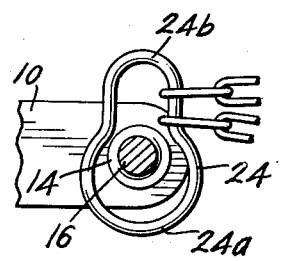
FIGURE 3 is a plan view partly in section, showing the key-hole link positioned over the ball and partly rotated, with the ball shank about to be received by the smaller portion of the key-hole link.

The safety device of the present invention comprises as its single most important element a key-hole link 24 having an enlarged portion 24a which is circular and a smaller portion 24b. To the key-hole link 24 are attached two chains 26 and 28 and possibly a third 30. Chains 26 and 28 are respectively attached to one side of the tongue 22 by means of bolts 32 or other suitable means. Chain 30 may be secured to a frame member of the towing vehicle as shown in FIGURE 1.

The effective length of the chains 26 and 28 and the size of the key-hole link 24 with respect to ball 12 is important to the most effective operation of the instant invention. The opening in the large portion 24a of key-hole link 24 should be large enough to easily receive ball 12 but not large enough to pass the ball if a link of chains 26, 28 or 30 is positioned on the larger portion 24a as in FIGURE 4. When chains 26 and 28 are positioned in the smaller portion 24b, the chains 26 and 28 are to be of a length to just permit the large portion 24a to be in vertical alignment with the ball receiving opening of coupling element 18 such that the key-hole link can be positioned over the ball as the ball is being received by element 18, FIGURE 2.

In use, the large portion 24a is slipped over the ball 12 and then the ball receiving opening of element 18 which is locked in position by lever 20. As link 24 is slipped down, due to the reduced diameter of shank 16, the key-hole link can be moved toward tongue 22 by a sufficient amount to produce an amount of slack in chains 26 and 28 such that the key-hole link 24 can be rotated, as in FIGURE 3, 180 degrees to the position of FIGURES 1 and 4, where the small portion 24b of link 24 is received by shank 16 and vertical removal from the ball is prevented by its larger diameter.

If element 18 is accidentally uncoupled from ball 12, the tension on chains 26 and 28 will prevent the key-hole link 24 from being rotated to a disengaging position as pointed out above, and when a link of chains 26 and 28 is on the large portion 24a, the link 24 cannot be removed from ball 12, further preventing disengagement of link 24 from ball 12. Further, as shown in dotted lines in FIGURE 1, element 18 will be supported upon link 24 in this position and in combination with chains 26 and 28 to either side of tongue 22, vertical and horizontal stability of the decoupled trailer is obtained.

Thus it is seen that the safety device of the invention as applied to trailer couplings accomplishes all the desired objectives and additionally is economical of manufacture, more so than conventional arrangements.

Figure 6:
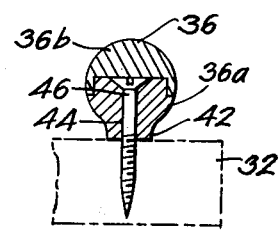
FIGURE 6 is a sectional view of a ball of the embodiment of FIGURE 5.
Figure 5:
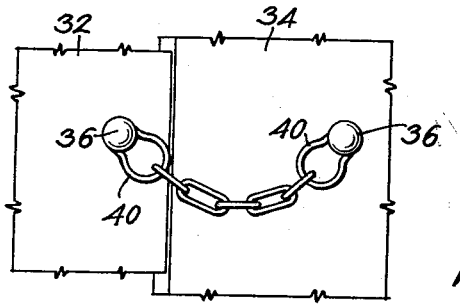
FIGURE 5 shows another embodiment of the present invention as applied to a safety chain for doors.

In FIGURE 5 there is shown another embodiment of the safety device of the invention in the form of the invention to secure a door against unauthorized opening. A door 32 and a wall 34 may each be provided with a ball 36 screwed thereinto. A chain 38 is provided with a key-hole link 40 on either end, the length of chain 38 being such that when the door is closed, a link 40 may be slipped over a ball 36 and rotated a half turn on shank 42 to the position shown. Again the size of the large end of link 40 is such that when a link of chain 38 is therein, the removal of link 40 over the ball is prevented. FIGURE 6 shows a sectional view of ball 36 which is comprised of a lower half 36a including shank 42 which has a bore 44 drilled therethrough and counter sunk to receive a screw 46 or the like, to secure the lower half to a door or wall. The upper part of lower half 36a is provided with a reduced diameter over which upper half 36b of generally hemispherical configuration having a circular recess mating with the reduced diameter of the lower half is press fit to cover screw 46 and complete the ball.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the time spirit and scope of the present invention.

What is claimed is:

1. In combination with a trailer coupling of the class which includes a ball portion having a shank of reduced diameter attached to a towing vehicle and a ball receiving portion attached to a trailer, a safety device which comprises a key-hole shaped link with at least one chain having a link thereof received by and connecting said key-hole link, the larger portion of the key-hole link being of a diameter sufficient to receive the ball portion of the coupling and the smaller portion of the key-hole link being of a size sufficient to receive the shank of the ball portion but insufficient to pass the ball, the chain being attached to said trailer and having an effective length just sufficient, when a link thereof is positioned in the smaller portion of the key-hole link and the ball receiving portion of the coupling is positioned to receive the ball, to permit the larger portion of the key-hole link to pass over the ball and the key-hole link to be rotated one half turn.

2. A device according to claim 1, wherein the larger portion of the key-hole link is of an effective diameter which is insufficient, when the connecting link of the chain is in position thereon, to pass the ball portion of said coupling.

3. A device according to claim 1, wherein the combined effective lengths of said key-hole link and said chain attached to the trailer, when the shank of the ball is within the smaller portion of the key-hole link, is such as to limit rearward movement of the ball receiving portion of said coupling, when decoupled from the ball, to not beyond that where the ball receiving portion is positioned upon and supported by the key-hole link.

4. In combination with a trailer coupling of the class which includes a ball portion having a shank of reduced diameter attached to a towing vehicle and a ball receiving portion attached to a trailer, a safety device which comprises a key-hole shaped link with at least one chain having a link thereof received by and connecting said key-hole link and said chain having another link thereof connected to a trailer, the larger portion of the key-hole link being of a diameter sufficient to receive the ball portion of the coupling and the smaller portion of the key-hole link being of a size sufficient to receive the shank of the ball portion but insufficient to pass the ball and wherein the larger portion of the key-hole link is of an effective diameter which is insufficient, when the connecting link of said chain is positioned thereon, to pass the ball portion of said coupling and the key-hole link can pass the ball only when said chain is positioned on the smaller portion of said key-hole link.

5. A safety coupling for maintaining two relatively movable members at a predetermined limit of separating movement, wherein at least one of said members has a circular terminal portion of predetermined diameter and a portion of smaller diameter, and said coupling consists of a chain and a key-hole link, attached to an end link thereof, the said key-hole link having a large circular portion of an inside diameter only slightly greater than the diameter of said terminal portion of said one member and a smaller portion of a size sufficient to receive said smaller diameter portion of said one member but insufficient to pass said terminal portion, said chain end link being freely movable from one portion of the key-hole link to the other and said chain end link when engaged in said large portion of the key-hole link reducing the effective inside diameter of said large portion whereby to prevent passage of said terminal portion therethrough, and means forming an element of the chain at the other end thereof for attachment to the other one of said members.

6. A safety device to cooperate with a coupling means adapted to couple together two relatively movable members one of which is provided with a ball portion having a shank of reduced diameter mounted thereon and the other is adapted to have a chain connected thereto, comprising in combination a key-hole link, and a chain having one link received by and connected to the key-hole link and another link thereof connected to the said member adapted to have a chain connected thereto, said key-hole link having a larger portion of a diameter sufficient to receive the ball portion of the coupling and a smaller portion of the key-hole link being of a size sufficient to receive the shank of the ball portion but insufficient to pass the ball, said one link being movable from one portion of the key-hole link to the other, and the said larger portion of the key-hole link being of an effective diameter which is insufficient, when said one link of said chain is positioned thereon, to pass the ball portion of said coupling, the key-hole link being able to pass the ball only when said chain is positioned on the smaller portion of said key-hole link, and said safety device when connected between the ball portion of said one member and the said member adapted to have a chain connected thereto, functioning to maintain such members at a predetermined limit of separating movement upon uncoupling of the members.

References Cited in the file of this patent

UNITED STATES PATENTS

| 1,037,991 | Robinson | Sept. 10, 1912 |
| 2,788,990 | Barcafer | Apr. 16, 1957 |
| 2,815,225 | Barcafer | Dec. 3, 1957 |
| 2,900,864 | Chapman et al. | Aug. 25, 1959 |